United States Patent [19]
Tamari

[11] Patent Number: 5,392,155
[45] Date of Patent: * Feb. 21, 1995

[54] DE-DIFFRACTION METHODS

[76] Inventor: Vladimir F. Tamari, 4-2-8-C26 Komazawa, Setagaya-ku, Tokyo, Japan, 154

[*] Notice: The portion of the term of this patent subsequent to Dec. 15, 2006 has been disclaimed.

[21] Appl. No.: 999,438

[22] Filed: Sep. 15, 1992

Related U.S. Application Data

[63] Continuation-in-part of Ser. No. 208,400, Jun. 17, 1988, Pat. No. 5,148,315.

[51] Int. Cl.$^6$ ............................................. G02B 27/42
[52] U.S. Cl. .................................. 359/558; 343/912; 359/562; 359/868
[58] Field of Search ............... 359/558, 562, 868, 869, 359/708; 343/753, 755, 912

[56] References Cited

U.S. PATENT DOCUMENTS

| | | | |
|---|---|---|---|
| 3,732,363 | 5/1973 | Glenn, Jr. | 369/109 |
| 3,770,340 | 11/1973 | Cronin et al. | 359/562 |
| 5,148,315 | 9/1992 | Tamari | 359/562 X |

Primary Examiner—William L. Sikes
Assistant Examiner—David R. Parsons
Attorney, Agent, or Firm—Oldham & Oldham & Wilson Co.

[57] ABSTRACT

In optical, microwave, acoustical and other wave fields diffraction spreading and loss of gain is countered by giving the wavefront approaching an aperture a bevelled lip or edge, whereby the radiation spreading inwards from this edge prevents the outward diffraction spreading of the field, and where any aberrations resulting from the de-diffraction process are corrected by methods analogous to those used to correct for spherical aberrations, the result of these adjustments being to cause a field such as that emitted by a lens or laser, to emerge free from diffraction spreading, gaining in resolution beyond the diffraction limits.

1 Claim, 1 Drawing Sheet

DE-DIFFRACTION METHODS

This present invention is a continuation in part of U.S. Pat. No. 5,148,315, filed as Ser. No. 07/208,400, on Jun. 17, 1988, and the entire text thereof is incorporated herein by reference.

TECHNICAL FIELD

The Cancellation of diffraction in wave fields (de-diffraction, or DD) was described in detail in my U.S. Pat. No. 5,148,315 (V. Tamari) entitled "A Method to Cancel Diffraction Effects from Wave Fields" (1992) herin to be referred to as the 'DD patent'. In U.S. Pat. No. 5,148,315, special focusing methods create a rounded corner added to the profile of a truncated geometrical wavefront in any instrument or device such as lenses, aperture plates, mirrors, GRIN lenses, microwave and other antennas, laser or other beams, whereby diffraction effects are cancelled or minimized. In the present invention, said wavefront corner need not be curved, but could be made up of one or more joined straight portions, simplifying the design and manufacturing process of said devices. Also modifications made to the wavefront itself to correct for aberrations caused by the DD process itself, will be described.

BRIEF DESCRIPTION OF DRAWINGS

Attention is now drawn to the accompanying drawings, where.

DISCLOSURE OF THE INVENTION

Figure 1:
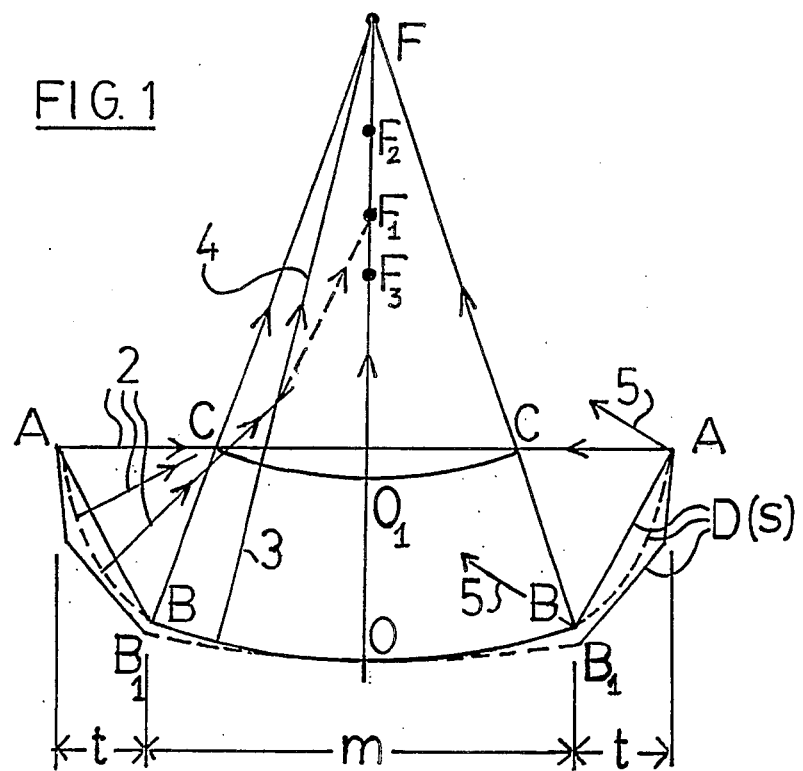
FIG. 1 Is a diagram of a de-diffracted focused wavefront.

In the DD patent, the geometrical wavefront passing through, emitted or reflected from an aperture will suffer diffraction spreading unless the said wavefront is extended tangentially to form a curved corner like a platter or a pie crust. This corner defines an optical path shortening function D(s) measured from the aperture's edge where s=0, having dimensions in the order of magnitude of the field's wavelength ($\lambda$) or more. For purposes of illustration here, it is assumed that D(s) is substantially a ¼-circle (AB) of radius (CA) where C lies on the ray emitted by the wavefront at B, as shown in FIG. 1. Rays (2) emitted AB form a mini-focus at or near C, and it is this energy inwards that prevents the outer diffraction of the wavefront ($CO_1C$). It is noted that in FIG. 1 all the forms illustrated should be symmetrical about the optic axis (OF), but for clarity either the left or right portion of the field will be shown, as the case may be. It is further understood that DD applies to any aperture edge, whether said aperture is symmetrical or not, or indeed if it is the edge of an infinite half-plane. The geometrical wavefront (BOB) shown in FIG. 1 to illustrate DD is spherical, being focused at F, but again any other wavefront approaching the aperture (AA) applies.

Two problems are experienced when the methods of the DD patent are applied, and their solution constitute the teachings of this invention.

Figure 2:
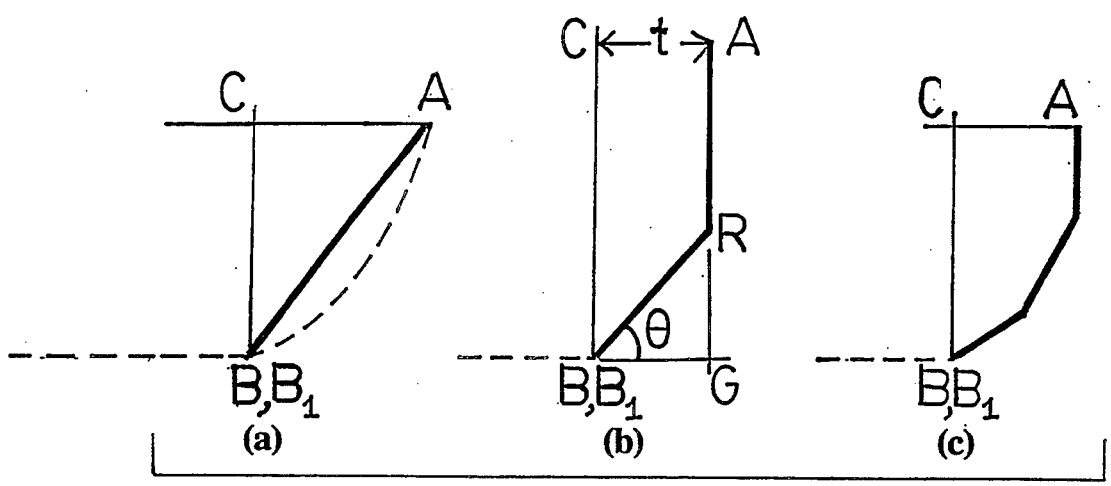
FIG. 2 a,b,c, is a detailed diagram of the de-diffracting bevelled edges.

First, for small elements such as lenses only a few millimeters in diameter, manufacturing an accurate curved DD edge only a few hundreds of wavelengths in radius can be a daunting technical task. Since new research results now indicate that any edge substantially overlapping or touching D(s) will work equally well to cancel the radiation, such edges can have a straight bevelled profile or consist of a combination of bevelled and curved portions, as shown in FIG. 2 (a,b,c), bearing in mind that the dimensions (AC) and (BC) should preferably be not less than ($\lambda$), except where the wavelength is very large, as will be mentioned below. The energy vector (5) from these bevelled edges, being directed inwards, would prevent the original wavefront beginning at (B) from spreading outwards as is known in classical diffraction.

Second, it was found that energy from (AB) causes aberrations to the geometrical vectors of the field. This of course has nothing to do with the original shape of the lens or antenna, and hence the shape of (BOB), but rather the edge rays (2) or (5) cause rays such as (3) to swerve, creating the streamline (4) and reaching the optic axis at ($F_1$), rather than at the intended geometrical focus (F). The pattern of aberrated rays reaching the focal region at ($F_1, F_2, F_3 ...$) suggests that the problem is almost exactly analogous in result —albeit for altogether different causes—to classical spherical aberration. DD aberrations of course are not restricted to spherical wavefronts, but can occur in plane or irregular wavefronts as well.

These DD aberrations can be treated using the same iterated computer simulations known in the art for the correction of spherical aberration, whereby the shape of the wavefront is changed until the wavefront assumes a rather more splayed, less concave shape, for example ($B_1OB_1$) in FIG. 1. of course with the DD edges ($B_1A$) attached and the best possible focus attained. It will be seen below how this process is especially needed for devices using large wavelengths compared to the overall aperture dimensions.

BEST MODE FOR CARRYING OUT THE INVENTION

The simple design of straight and bevelled DD edges (AB) or ($AB_1$) simplify the design, simulation and manufacture of the devices to which DD is applied. For example, in a DD lens, the edge can be bevelled in a single grinding rather than the laborious process needed to create the rounded edge of the DD patent. As to the DD aberration control described, the required lens, antenna or mirror profile adjustments necessary may be rather subtle, with non-conic profiles of the refracting or reflecting surfaces. Besides the use of computer simulations to design such surfaces, trial and error methods may be attempted with models such as a cylindrical reflector for ultrasound fields.

A rule of thumb for designing DD edges is that, since the radiation reaching the edge regions is wasted merely to counter diffraction, and moreover it is the cause of aberrations, the ratio (t/m) of the size of the DD edge (t) and the overall size of the geometrical wavefront (m) as in FIG. 1, must be a minimum. The trouble is that diffraction loss depends on ($\lambda$), and it is preferable that the height (AG) of FIG. 2 (b) be a few wavelengths at least. For optical lenses and mirrors this causes no problems, since even an edge several hundred wavelengths in size will still provide a low (t/m) ratio. Similarly the DD aberration caused by such small-wavelength DD edges can be ignored or corrected without making too much difference to the sharpness of the super-resolved point spread function at the focal plane. A low (t/m) ratio is also to be found in millimeter microwave DD antennas where (m) might be a meter or so.

In the case of radio telescopes using very large (λ) or of miniature diode lasers, the (t/m) ratio might even approach unity, and the minimum (t) must be used. Increasing the angle (θ) of the bevelled edge of FIG.2 (b) and increasing the edge height (AG) might be the answer.

As described in U.S. Pat. No. 5,148,315, the same methods herin described can also be applied to the design of GRIN lenses, laser windows or apertures or any other device suffering from diffraction spread. Lasers, microwave and other beams passing through DD lenses or DD GRIN lenses, or reflected from mirrors or antennas, or emitted from such devices will not experience diffraction spread, but will propagate only in the forward direction.

What is claimed is:

1. A method or cancel or minimize diffraction effects for an optical or other electromagnetic wave-field or any other wave-field emitted, transmitted or reflected by or from any device or instrument, where said wave-field suffers from diffraction effects due to its being limited by the size of an emitting, transmitting or reflecting device, pupil or aperture, hereafter to be referred to as the aperture, wherein the path length which an approaching wavefront of said wave-field needs to traverse in order to reach an aperture plane is altered, so that the same wavefront retains its original shape everywhere within said aperture, except in the region of an edge of said aperture whereby the said wavefront is caused to have a raised edge or lip continuous with the said wavefront, so that along any line segment(s) lying in said aperture plane and normal to and measured from the said aperture edge, the path alteration function D(s) measured normal to said aperture plane, is zero at said aperture edge, and increases continuously to form a corner, with a profile being formed by at least one straight or curved segment or a combination of straight or curved segments formed to direct the edge portions of the wavefront inwards, wherein the ratio (t/m) is as minimum as possible and wherein the width of the edge is t and the overall width of the geometrical wavefront is m, said widths measured parallel to the aperture plane and D(s) thereby reaching a maximum value equal to or larger than a wavelength of said wave-field, where said corner joins with said original wavefront's profile, and retaining the said constant maximum value everywhere in the said aperture except at said corners, whereby the result of said alteration function D(s) in said path length is caused in the case of a lens or reflector by adding a corner to the profile of said lens or reflector, consisting of at least one straight or curved segment or a combination of straight or curved segments, to refocus the said wavefront so that said wave-field will leave said aperture in its geometrical or undiffracted form, thereby increasing the gain or directivity of the said field if it is an unfocused beam, or increasing the resolution beyond the diffraction limits, thereby achieving superresolution in the case of focused fields.

* * * * *